US010384764B2

(12) United States Patent
Blanc et al.

(10) Patent No.: US 10,384,764 B2
(45) Date of Patent: Aug. 20, 2019

(54) SYSTEM FOR ACTUATING A CONTROL SURFACE OF AN AIRCRAFT

(71) Applicant: Airbus Operations SAS, Toulouse (FR)

(72) Inventors: Sébastien Blanc, La Salvetat Saint-Gilles (FR); Esteban Quiroz-Hernandez, Toulouse (FR); Robin Vernay, Tournefeuille (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 123 days.

(21) Appl. No.: 15/658,060

(22) Filed: Jul. 24, 2017

(65) Prior Publication Data

US 2018/0022442 A1 Jan. 25, 2018

(30) Foreign Application Priority Data

Jul. 25, 2016 (FR) .................................... 16 57095

(51) Int. Cl.
*B64C 13/40* (2006.01)
*F15B 11/10* (2006.01)
(Continued)

(52) U.S. Cl.
CPC .............. *B64C 13/40* (2013.01); *F15B 11/10* (2013.01); *F15B 13/00* (2013.01); *F15B 13/01* (2013.01);
(Continued)

(58) Field of Classification Search
CPC ..... B64C 13/40; B64C 13/504; B64C 13/505; B64C 13/506; F16K 47/00
See application file for complete search history.

(56) References Cited

U.S. PATENT DOCUMENTS

| 3,095,906 A | 7/1963 | Kolm |
| 5,343,703 A | 9/1994 | Kamimura |
| (Continued) | | |

FOREIGN PATENT DOCUMENTS

| FR | 2444825 | | 7/1980 |
| GB | 2038511 | A * | 7/1980 |
| JP | 3549024 | | 8/2004 |
| JP | 3549024 | B2 * | 8/2004 |

OTHER PUBLICATIONS

Machine translation of JP 3549024. Aug. 2004 (Year: 2004).*
French Search Report, dated Feb. 17, 2017, priority document.

*Primary Examiner* — Thomas E Lazo
(74) *Attorney, Agent, or Firm* — Greer, Burns & Crain, Ltd.

(57) ABSTRACT

An actuating system comprising a hydraulic actuator provided with a cylindrical cavity containing a piston configured to slide within the cylindrical cavity and a rod. The piston separates the cylindrical cavity into a first actuating chamber and a second actuating chamber. A first servo valve comprises a sheath including a first slider configured to slide within a cavity of the sheath on the basis of command signals from a command system. The cavity of the sheath comprises a first command chamber and a second command chamber on either side of the first slider. The first actuating chamber is fluidically connected to the first command chamber, and the second actuating chamber is fluidically connected to the second command chamber.

11 Claims, 3 Drawing Sheets

(51) Int. Cl.
*F15B 13/01* (2006.01)
*F15B 13/04* (2006.01)
*F15B 13/044* (2006.01)
*F16K 11/07* (2006.01)
*F16K 31/04* (2006.01)
*F16K 47/00* (2006.01)
*F15B 13/00* (2006.01)

(52) U.S. Cl.
CPC ........ *F15B 13/0402* (2013.01); *F15B 13/044* (2013.01); *F15B 13/0407* (2013.01); *F16K 11/07* (2013.01); *F16K 31/04* (2013.01); *F16K 47/00* (2013.01); *F15B 2211/7053* (2013.01)

(56) References Cited

U.S. PATENT DOCUMENTS

| | | | |
|---|---|---|---|
| 5,615,593 A * | 4/1997 | Anderson | G05D 1/101 |
| | | | 91/24 |
| 7,740,556 B2 * | 6/2010 | Iwase | F15B 20/008 |
| | | | 476/10 |
| 2002/0121087 A1 * | 9/2002 | Van Den Bossche | |
| | | | B64C 13/42 |
| | | | 60/476 |
| 2015/0114151 A1 | 4/2015 | Hirai | |
| 2015/0176612 A1 * | 6/2015 | Bihel | B64C 13/40 |
| | | | 91/509 |
| 2016/0096617 A1 * | 4/2016 | Ito | B64C 9/323 |
| | | | 92/51 |

* cited by examiner

SYSTEM FOR ACTUATING A CONTROL SURFACE OF AN AIRCRAFT

CROSS-REFERENCES TO RELATED APPLICATIONS

This application claims the benefit of the French patent application No. 1657095 filed on Jul. 25, 2016, the entire disclosures of which are incorporated herein by way of reference.

TECHNICAL FIELD

The present invention relates to a system for actuating a control surface of an aircraft, such as an aileron, a flap, an elevator or a rudder. This actuating system also has the object of alleviating the load on the control surface and on its support structure.

BACKGROUND OF THE INVENTION

There are various systems for actuating a control surface of an aircraft. There are also systems with which it is possible to alleviate the load to which such a control surface is subjected.

Various load alleviation strategies are known. Active load alleviation may be effected for low-frequency side wind perturbations on a vertical tail plane (or VTP) of an aircraft. This load alleviation may be effected using measurements of these perturbations taken by a sideslip probe. Furthermore, passive alleviation of the wing loading due to gusts (gust load alleviation, GLA) can be implemented using gust perturbation measurements provided by an angle of attack probe (or AoA) or using vertical load factor measurements. In addition, maneuver load alleviation (or MLA) for the wing loading during a maneuver may be based on measurement of the vertical load factor, the roll rate or other appropriate parameters for detecting dynamic maneuvers.

With regard to the actuation of a control surface of an aircraft, use is made of systems based on position or systems based on force sensors.

Systems based on position generally comprise a slaving loop. The slaving loop includes a three-position hydraulic servo valve which controls a piston actuator. The piston actuator makes it possible to transmit a movement to the control surface by the intermediary of the piston. A flight control system of the aircraft sends a command that is representative of a target position of the piston. The actual position of the piston is measured and compared with the target position. The hydraulic servo valve is opened or closed in order to change the position of the piston as a function of the difference between the measured position of the piston and the target position. Thus, the actuator is able to obey the commands of the flight control system.

However, when said difference between the measured position of the piston and the target position is zero, the servo valve remains closed whatever the external loads. In order to protect the system from external loads when the servo valve is closed, it is necessary to provide pressure release valves in order to protect the actuator from overpressure. These valves make it possible to prevent overpressures in the actuator in the event of extreme loads. However, these valves do not make it possible to alleviate the load in the maneuver, turbulence or gust situations used for designing the plane. Therefore, this architecture is not entirely satisfactory.

Systems based on force sensors are normally used when the spoilers of the aircraft are pressed against the wings. In this case, the slaving loop of the system does not control the position of the piston of the actuator but implements specific force sensors, in particular load cells, which measure the loads experienced by the control surface.

SUMMARY OF THE INVENTION

The present invention has an object of remedying this drawback by proposing a system with which it is possible to simultaneously actuate a control surface and alleviate the load on this control surface and its support structure.

To that end, the invention relates to a system for actuating a control surface of an aircraft, of the type comprising:

a hydraulic actuator comprising a cylindrical cavity containing a piston that is able to slide within the cylindrical cavity and a rod, the piston separating the cylindrical cavity into a first actuating chamber and a second actuating chamber, the rod being able to transmit a movement of the piston to a control surface, a first servo valve that can be commanded by a command system, the first servo valve comprising a sheath including a first slider that is able to slide within a cavity of the sheath in accordance with command signals from the command system, the cavity of the sheath comprising a first command chamber and a second command chamber, respectively on either side of the first slider.

According to the invention, the first actuating chamber is fluidically connected to the first command chamber, and the second actuating chamber is fluidically connected to the second command chamber.

Thus, by virtue of the fluidic connections between the actuating chambers of the hydraulic actuator and the command chambers of the servo valve, it is possible to simultaneously actuate the control surface of the aircraft and alleviate the load on the control surface, as stated above, and thus to remedy the aforementioned drawback.

According to one particular feature, the first servo valve corresponds to a proportional distributor having at least four orifices:

a first orifice corresponding to a high-pressure input orifice, a second orifice corresponding to a low-pressure outlet orifice, a third orifice fluidically connected to the first actuating chamber and a fourth orifice fluidically connected to the second actuating chamber.

According to another particular feature, the first slider comprises at least three positions:

a first position in which the first orifice is fluidically connected to the third orifice and the second orifice is fluidically connected to the fourth orifice, a second position in which the first orifice is fluidically connected to the fourth orifice and the second orifice is fluidically connected to the third orifice, a third position in which the first slider prevents the connection between, on one hand, the first orifice and the second orifice and, on the other hand, the third orifice and the fourth orifice.

According to one embodiment, the first servo valve comprises a damping unit that is able to damp the sliding motion of the first slider in the sheath of the first servo valve.

According to another embodiment, the system comprises a second servo valve comprising a second slider that can be controlled by the command system, the second servo valve corresponding to a distributor that includes at least five orifices:

a first orifice fluidically connected to the first command chamber, a second orifice fluidically connected to the second command chamber, a third orifice corresponding to a low-pressure outlet orifice, a fourth orifice fluidically connected to the first actuating chamber, a fifth orifice fluidically connected to the second actuating chamber.

Furthermore, the second slider comprises at least two positions:

a first position in which the first orifice is fluidically connected to the fourth orifice, the second orifice is fluidically connected to the fifth orifice and the third orifice is obstructed, a second position in which the first orifice is fluidically connected to the second orifice and to the third orifice, the fourth orifice is obstructed and the fifth orifice is obstructed.

The above-described system for actuating a control surface of an aircraft is used in accordance with a use method which comprises:

a step of transmitting a command signal that is representative of a force to be exerted on a slider of a first servo valve, said command signal being sent by a command system to the first servo valve, a step of positioning the first servo valve as a function of said command signal.

The invention also relates to an aircraft, in particular a transport airplane, comprising a system for actuating a control surface of an aircraft, such as that described above.

BRIEF DESCRIPTION OF THE DRAWINGS

The invention, with its features and advantages, will become more evident upon reading the description provided with reference to the appended drawings, in which.

DETAILED DESCRIPTION OF THE PREFERRED EMBODIMENTS

The remainder of the description will refer to the above-mentioned figures.

The invention relates to a system 1 for actuating a control surface 5 of an aircraft AC, installed in the aircraft AC.

Figure 5:
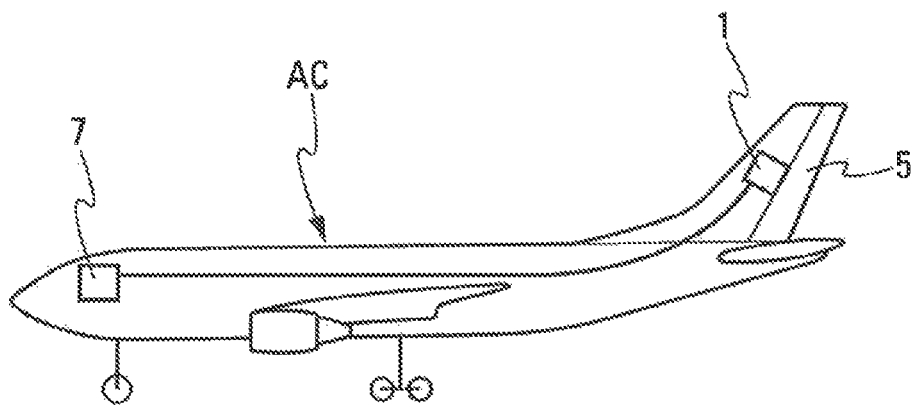
FIG. 5 shows an aircraft comprising the system for actuating a control surface.
Figure 6:
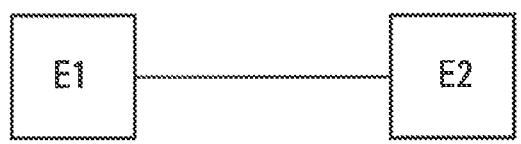
FIG. 6 shows a synoptic diagram of the method for using the system for actuating a control surface.

The actuating system 1 can be applied to any type of control surface 5, in particular the rudder of the aircraft AC, as shown in FIG. 5.

Figure 1:
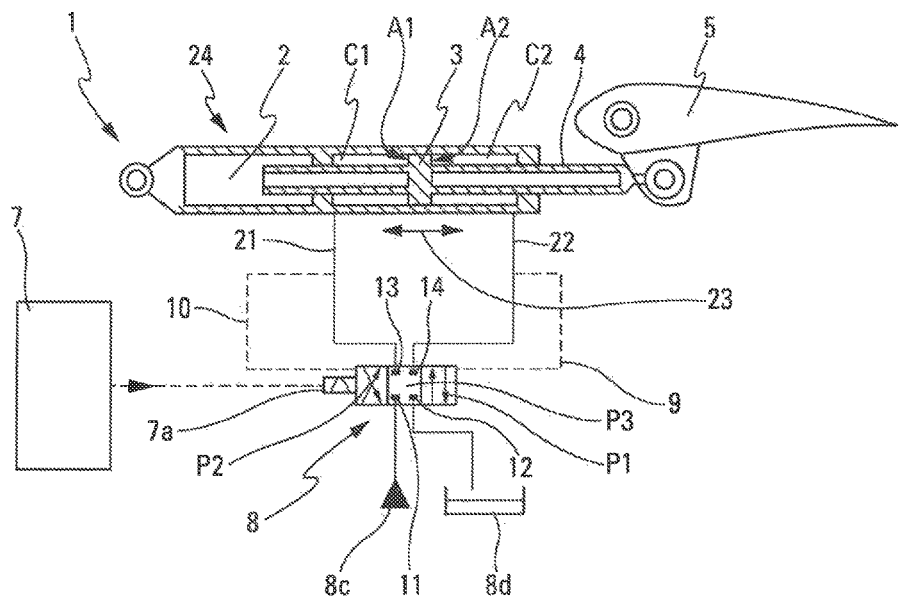
FIG. 1 shows the synoptic diagram of one embodiment of the actuating system.
Figure 2:
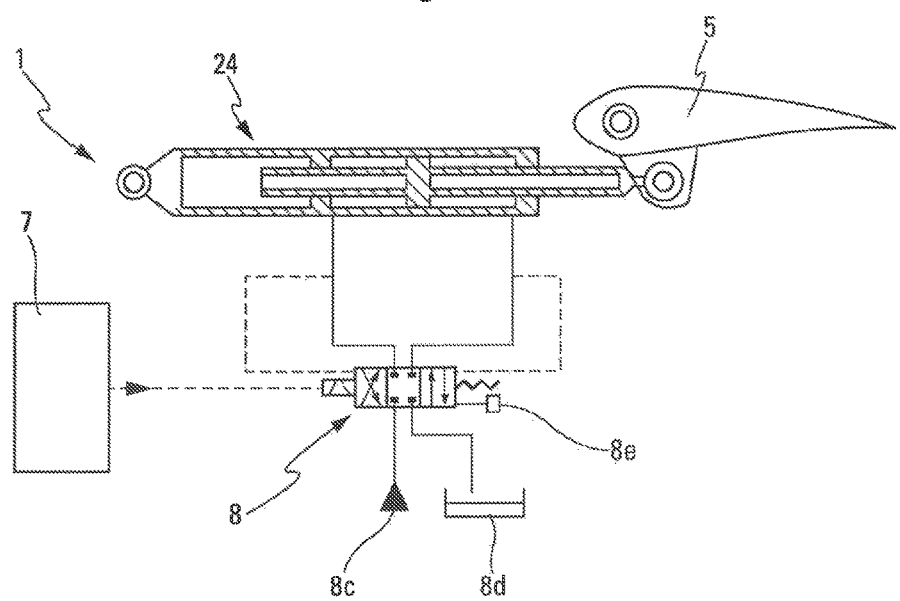
FIG. 2 shows a synoptic diagram of a variant of the actuating system of the embodiment shown in FIG. 1.

The actuating system 1, which is shown in FIGS. 1 and 2 and is installed in the aircraft AC, comprises a hydraulic actuator 24. In the remainder of the description, the hydraulic actuator 24 is referred to as the "actuator." The actuator 24 contains a cylindrical cavity 2 in which a piston 3 is able to slide. The piston 3 separates the cylindrical cavity 2 into a first actuating chamber C1 and a second actuating chamber C2. A pressure difference between the actuating chambers C1 and C2 allows the piston 3 to move. A rod 4 can transmit a movement, illustrated by a double arrow 23 in FIG. 1, from the piston 3 to the control surface 5.

Figure 4:
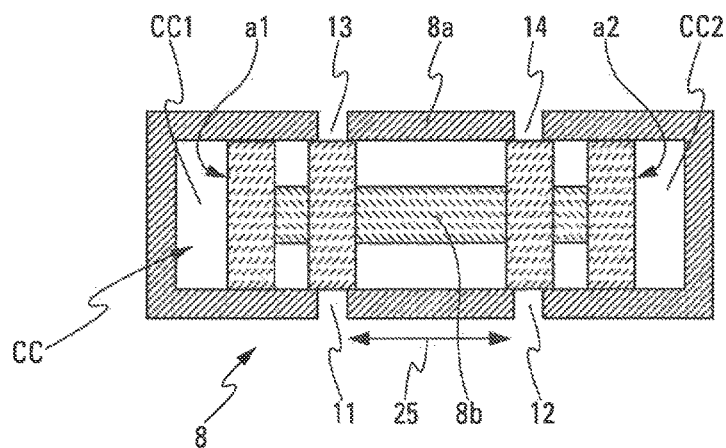
FIG. 4 schematically shows a section through a servo valve according to one embodiment.

The actuating system 1 also comprises a first servo valve 8 that can be commanded by a command system 7 which may form part of a flight control system of the aircraft AC. The first servo valve 8 comprises a sheath 8a in which a slider 8b is able to slide within a cavity CC of said sheath 8a (FIG. 4). The slider 8b slides, shown by a double arrow 25 in FIG. 4, in accordance with command signals received from the command system 7.

The cavity CC of the sheath 8a comprises a first command chamber CC1 and a second command chamber CC2, which are respectively on either side of the slider 8b. Sliding of the slider 8b makes it possible to change the pressures in each of the command chambers CC1 and CC2.

The actuating chamber C1 is fluidically connected to the command chamber CC1 such that the pressure in the actuating chamber C1 is essentially equal to the pressure in the command chamber CC1 Similarly, the actuating chamber C2 is fluidically connected to the command chamber CC2 such that the pressure in the actuating chamber C2 is equal to the pressure in the command chamber CC2.

By way of example, the fluidic connections are conduits, manifolds or pipes or any other module allowing pressure to communicate between the actuating chambers C1, C2 and the command chambers CC1, CC2.

According to one particular feature, the first servo valve 8 corresponds to a proportional distributor including at least four orifices 11, 12, 13 and 14:

a first orifice 11 corresponding to a high-pressure input orifice, a second orifice 12 corresponding to a low-pressure outlet orifice, a third orifice 13 fluidically connected to the first actuating chamber C1 and a fourth orifice 14 fluidically connected to the second actuating chamber C2 corresponding to two use orifices.

The orifice 11 corresponding to the high-pressure input orifice is for example fluidically connected to a pump 8c delivering pressurized fluid.

Also, the orifice 12 corresponding to the low-pressure outlet orifice is for example fluidically connected to a reserve tank 8d.

According to another particular feature, the slider 8b comprises at least three positions P1, P2 and P3:

a first position P1 in which the orifice 11 is fluidically connected to the orifice 13 and the orifice 12 is fluidically connected to the orifice 14, a second position P2 in which the orifice 11 is fluidically connected to the orifice 14 and the orifice 12 is fluidically connected to the orifice 13, a third position P3 in which the slider 8b prevents the connection between, on one hand, the orifice 11 corresponding to the input orifice and the orifice 12 corresponding to the outlet orifice and, on the other hand, the orifices 13 and 14 corresponding to the use orifices.

According to one embodiment, the servo valve 8 comprises a damping unit 8e that is able to damp the sliding motion of the slider 8b in the sheath 8a of the servo valve 8. The damping unit 8e, for example, comprises springs which may or may not be preloaded. This damping unit 8e makes it possible to adjust the dynamic behavior of the actuating system 1. It can be of use with respect to the requirements for flutter stability of the control surface 5.

Thus, by virtue of the actuating system 1, the command system 7 of the aircraft AC no longer commands a target position obtained by a slaving loop on the basis of a difference in position between an actual position and a target position. Instead, the command system 7 commands a force from the actuator 24. Closed-loop control is obtained directly by the equilibrium between the forces acting on the servo valve 8.

Of the many forces acting on the servo valve 8, one is a force produced by a transducer 7a such as a solenoid, which converts the command from the command system 7 into a force acting on the servo valve 8.

For example, the command signals are signals sent electrically to the transducer 7a. The transducer 7a converts the electrical signals into magnetic signals which allow the slider 8b to slide in the cavity of the sheath 8a.

Two hydraulic pressure forces act in addition to the forces acting on the servo valve 8:

a hydraulic pressure force acting with a pressure in the command chamber CC1 equal to the pressure prevailing in the actuating chamber C1 on a surface a1 that is proportional to the surface A1 of the piston 3, and a hydraulic pressure force acting with a pressure in the command chamber CC2 equal to the pressure prevailing in the actuating chamber C2 on a surface a2 that is proportional to the surface A2 of the piston 3.

The actuating system 1 is configured such that the force commanded by the command system 7 follows the external loads acting on the piston 3.

The equilibrium between the forces on the piston 3 means that the external loads acting on the rod 4 are equal to the hydraulic pressure forces on the piston 3.

The external loads acting on the rod 4 include the aerodynamic loads on the control surface 5, the inertial loads caused by accelerations of the control surface 5, the damping loads caused by parallel passive actuators, and loads that oppose forces caused by the parallel actuators, for example in the event of a fault.

For each actuating chamber C1, C2, the hydraulic pressure force acting on the piston 3 is equal to the pressure in said actuating chamber C1, C2 multiplied by the surface A1, A2 of the piston 3 in said actuating chamber C1, C2.

We therefore have the following equation for the forces acting on the piston:

$$F_{external} = P_1 \times A_1 - P_2 \times A_2,$$

where $F_{external}$ corresponds to the external loads acting on the rod 4, $P_1$ corresponds to the pressure prevailing in the actuating chamber C1, $P_2$ corresponds to the pressure prevailing in the actuating chamber C2, $A_1$ corresponds to the surface A1 of the piston 3 in the actuating chamber C1, A2 corresponds to the surface A2 of the piston 3 in the actuating chamber C2.

The equilibrium between the forces on the servo valve 8 means that the force commanded by the command system 7 via the transducer 7a is equal to the hydraulic pressure forces on the servo valve 8.

For each command chamber CC1, CC2, the hydraulic pressure force acting on the servo valve 8 is equal to the pressure in said command chamber CC1, CC2 multiplied by the surface a1, a2 of the servo valve 8 in said command chamber CC1, CC2.

We therefore have the following equation for the forces acting on the piston 3:

$$F_{command} = P_1 \times a_1 - P_2 \times a_2,$$

where $F_{command}$ corresponds to the force commanded by the command system 7, $P_1$ corresponds to the pressure prevailing in the command chamber CC1, $P_2$ corresponds to the pressure prevailing in the command chamber CC2, $a_1$ corresponds to the surface a1 of the servo valve 8 in the command chamber CC1, $a_2$ corresponds to the surface a2 of the servo valve 8 in the command chamber CC2.

The surface A1 of the piston 3 in the actuating chamber C1 is proportional to the surface a1 of the servo valve 8 in the command chamber CC1: $a_1 = k \times A_1$.

Equally, the surface A2 of the piston 3 in the actuating chamber C2 is proportional to the surface a2 of the servo valve 8 in the command chamber CC2: $a_2 = k \times A_2$.

We can therefore obtain the following equation: $F_{command} = k \times F_{external}$.

Thus, the external loads on the piston 3 follow the force commanded by the command system 7 in order to be within the equilibrium conditions.

Most of the time, the greatest external load is the aerodynamic force. In this case, the command system 7 commands approximately an aerodynamic load on the control surface 5.

Thus, the load on the control surface 5 is a known quantity determined by the command system 7. Load following does not depend on calculation measurements or times.

With regard to passive load alleviation, in general, if the load through the control surface 5 remains approximately constant in spite of external perturbations such as gusts or turbulence, the variations in load on the support structure of the control surface 5 will be smaller. For example, the loads caused by a perturbation will be smaller on the vertical tail plane if the loads on the rudder remain approximately constant.

This principle is applicable both when the load changes slowly, for example during a maneuver, and when it changes rapidly, for example in the event of gusts.

External perturbations such as turbulence do not need to be anticipated or measured since the actuating system 1 ensures that the commanded force is followed.

It can also be noted that the actuator 24 is protected with regard to overpressure without the need for pressure release valves.

Figure 3:
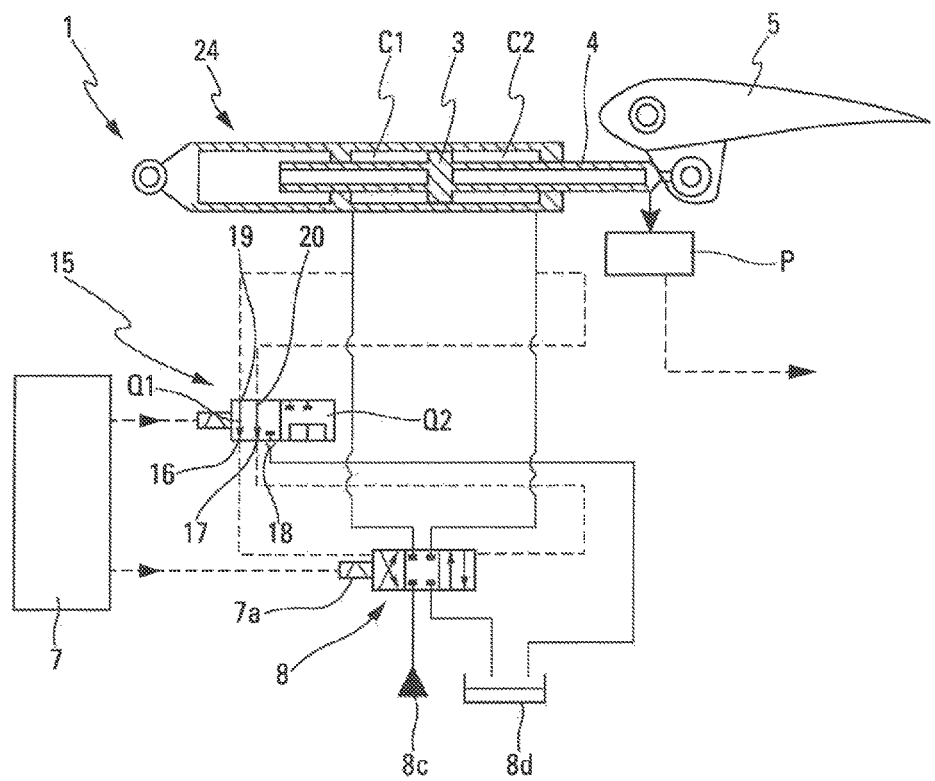
FIG. 3 shows a synoptic diagram of another embodiment.

According to one embodiment, shown in FIG. 3, the actuating system 1 comprises a second servo valve 15 comprising a slider (not shown) that can be controlled by the command system 7.

The servo valve 15 corresponding to a distributor includes at least five orifices 16, 17, 18, 19, 20:

a first orifice 16 fluidically connected to the command chamber CC1, a second orifice 17 fluidically connected to the command chamber CC2, a third orifice 18 corresponding to a low-pressure outlet orifice, a fourth orifice 19 fluidically connected to the first actuating chamber C1, a fifth orifice 20 fluidically connected to the actuating chamber C2.

Furthermore, the slider of the servo valve 15 comprises at least two positions Q1, Q2:

a first position Q1 in which the orifice 16 is fluidically connected to the orifice 19, the orifice 17 is fluidically connected to the orifice 20 and the orifice 18 is obstructed, a second position Q2 in which the orifice 16 is fluidically connected to the orifice 17 and to the orifice 18, the orifice 19 is obstructed and the orifice 20 is obstructed.

By virtue of the servo valve 15, the actuating system 1 can also function as a position-based system. The system then comprises a position sensor P which measures an actual position of the piston 3 of the actuator 24 which is representative of the position of the control surface 5. The actual position of the piston 3 is measured and compared to a setpoint position commanded by the command system 7. The servo valve 8 is opened or closed in order to change the position of the piston 3 as a function of the difference between the measured position of the piston 3 and the setpoint position.

In the first position Q1 of the slider, the system operates by an equilibrium between the forces acting on the piston 3 of the actuator 24 and on the servo valve 8. In the second position Q2 of the slider, the system operates as a system based on the position of the piston 3.

The actuating system 1 can be used by implementing a method which comprises:

a step E1 of transmitting a command signal that is representative of a force to be exerted on a slider 8b of a first servo valve 8, said command signal being sent by a command system 7 to the first servo valve 8, a step E2 of positioning the first servo valve 8 in accordance with said command signal.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for actuating a control surface of an aircraft, comprising:

a hydraulic actuator comprising a cylindrical cavity containing a piston that is configured to slide within the cylindrical cavity and a rod, the piston separating the cylindrical cavity into a first actuating chamber and a second actuating chamber, the rod being configured to transmit a movement of the piston to a control surface, a first servo valve configured to be commanded by a command system, the first servo valve comprising a sheath including a first slider that is configured to slide within a cavity of the sheath in accordance with command signals from the command system, the cavity of the sheath comprising a first command chamber and a second command chamber, respectively on either side of the first slider, wherein the first actuating chamber is fluidically connected to the first command chamber, and the second actuating chamber is fluidically connected to the second command chamber, and wherein the first servo valve comprises a damping unit that is able to damp the sliding motion of the first slider in the sheath of the first servo valve.

2. The system as claimed in claim 1, wherein the first servo valve corresponds to a proportional distributor having at least four orifices:

a first orifice corresponding to a high-pressure input orifice, a second orifice corresponding to a low-pressure outlet orifice, a third orifice fluidically connected to the first actuating chamber, and a fourth orifice fluidically connected to the second actuating chamber.

3. The system as claimed in claim 1, wherein the first slider comprises at least three positions:

a first position in which the first orifice is fluidically connected to the third orifice and the second orifice is fluidically connected to the fourth orifice, a second position in which the first orifice is fluidically connected to the fourth orifice and the second orifice is fluidically connected to the third orifice, a third position in which the first slider prevents the connection between, on one hand, the first orifice and the second orifice and, on the other hand, the third orifice and the fourth orifice.

4. The system as claimed in claim 1, wherein the second slider comprises at least two positions:

a first position in which the first orifice is fluidically connected to the fourth orifice, the second orifice is fluidically connected to the fifth orifice and the third orifice is obstructed, a second position in which the first orifice is fluidically connected to the second orifice and to the third orifice, the fourth orifice is obstructed and the fifth orifice is obstructed.

5. A method for using a system for actuating a control surface of an aircraft as claimed in claim 1, comprising:

transmitting a command signal representative of a force to be exerted on a slider of a first servo valve, said command signal being sent by a command system to the first servo valve, and positioning the first servo valve as a function of said command signal.

6. An aircraft, comprising a system for actuating a control surface as claimed in claim 1.

7. A system for actuating a control surface of an aircraft, comprising:

a hydraulic actuator comprising a cylindrical cavity containing a piston that is configured to slide within the cylindrical cavity and a rod, the piston separating the cylindrical cavity into a first actuating chamber and a second actuating chamber, the rod being configured to transmit a movement of the piston to a control surface, a first servo valve configured to be commanded by a command system, the first servo valve comprising a sheath including a first slider that is configured to slide within a cavity of the sheath in accordance with command signals from the command system, the cavity of the sheath comprising a first command chamber and a second command chamber, respectively on either side of the first slider, wherein the first actuating chamber is fluidically connected to the first command chamber, and the second actuating chamber is fluidically connected to the second command chamber, and further comprising a second servo valve comprising a second slider that is configured to be controlled by the command system, the second servo valve corresponding to a distributor that includes at least five orifices:
  a first orifice fluidically connected to the first command chamber,
  a second orifice fluidically connected to the second command chamber,
  a third orifice corresponding to a low-pressure outlet orifice,
  a fourth orifice fluidically connected to the first actuating chamber,
  a fifth orifice fluidically connected to the second actuating chamber.

8. The system as claimed in claim 7, wherein the first servo valve corresponds to a proportional distributor having at least four orifices:
  a first orifice corresponding to a high-pressure input orifice,
  a second orifice corresponding to a low-pressure outlet orifice,
  a third orifice fluidically connected to the first actuating chamber, and
  a fourth orifice fluidically connected to the second actuating chamber.

9. The system as claimed in claim 7, wherein the first slider comprises at least three positions:
  a first position in which the first orifice is fluidically connected to the third orifice and the second orifice is fluidically connected to the fourth orifice,
  a second position in which the first orifice is fluidically connected to the fourth orifice and the second orifice is fluidically connected to the third orifice,
  a third position in which the first slider prevents the connection between, on one hand, the first orifice and the second orifice and, on the other hand, the third orifice and the fourth orifice.

10. A method for using a system for actuating a control surface of an aircraft as claimed in claim 7, comprising:
  transmitting a command signal representative of a force to be exerted on a slider of a first servo valve, said command signal being sent by a command system to the first servo valve, and
  positioning the first servo valve as a function of said command signal.

11. An aircraft, comprising a system for actuating a control surface as claimed in claim 7.

* * * * *